(No Model.)
3 Sheets—Sheet 1.

T. J. BROUGH.
HYDROCARBON GAS APPARATUS.

No. 262,363.
Patented Aug. 8, 1882.

WITNESSES:
W. W. Hollingsworth
Edw. W. Byrn

INVENTOR:
T. J. Brough
BY
ATTORNEYS.

(No Model.)
T. J. BROUGH.
HYDROCARBON GAS APPARATUS.
No. 262,363.  Patented Aug. 8, 1882.
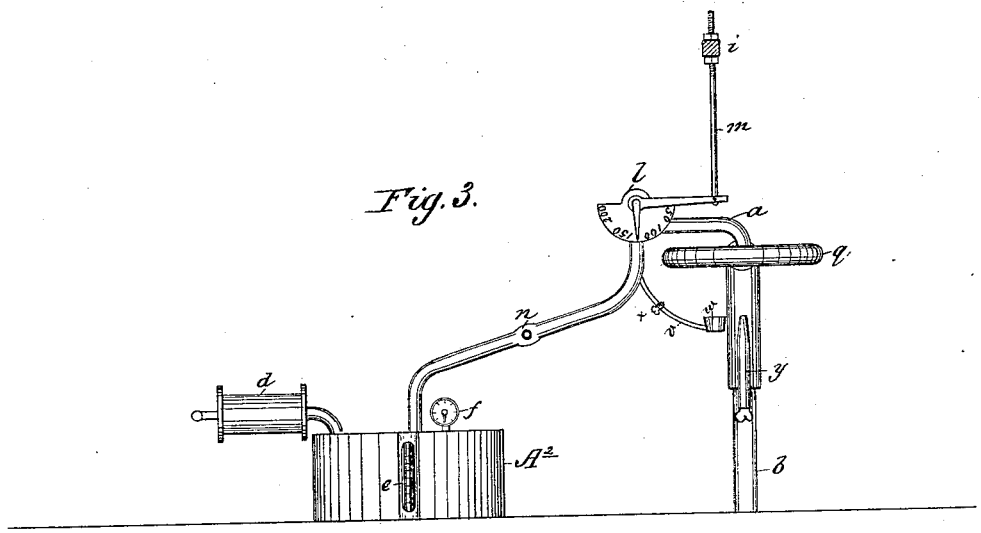
Fig. 3.
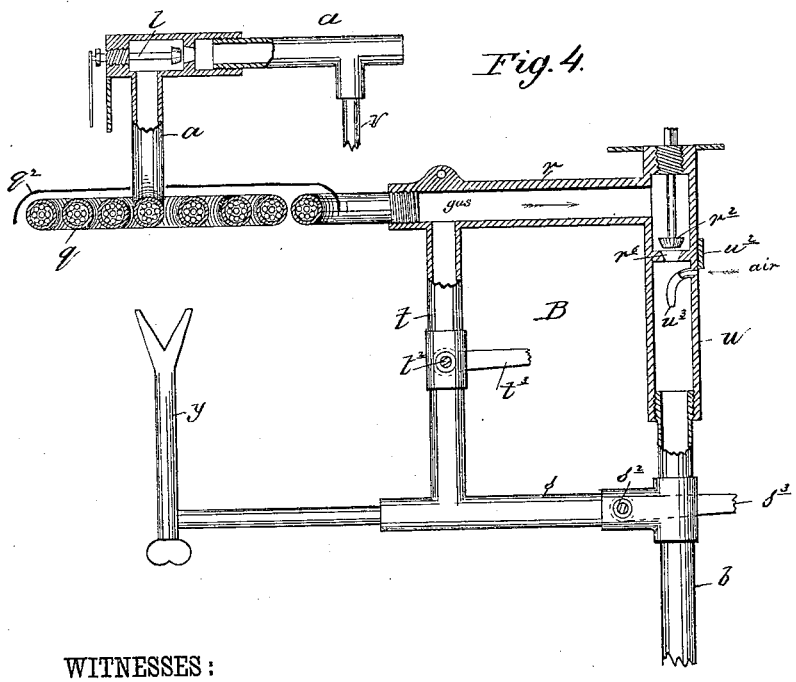
Fig. 4.
WITNESSES:
W. W. Hollingsworth
Edw. W. Byrn
INVENTOR:
T. J. Brough
BY 
ATTORNEYS.

UNITED STATES PATENT OFFICE.

THOMAS J. BROUGH, OF BALTIMORE, MARYLAND, ASSIGNOR OF ONE-HALF TO CLARK DAVIS FORSYTH, OF SAME PLACE.

HYDROCARBON-GAS APPARATUS.

SPECIFICATION forming part of Letters Patent No. 262,363, dated August 8, 1882.

Application filed January 3, 1882. (No model.)

*To all whom it may concern:*

Be it known that I, THOMAS JAMES BROUGH, of Baltimore city, in the State of Maryland, have invented a new and Improved Hydrocarbon-Gas Apparatus; and I do hereby declare that the following is a full, clear, and exact description of the same, reference being had to the accompanying drawings, forming part of this specification, in which—

Figure 1:
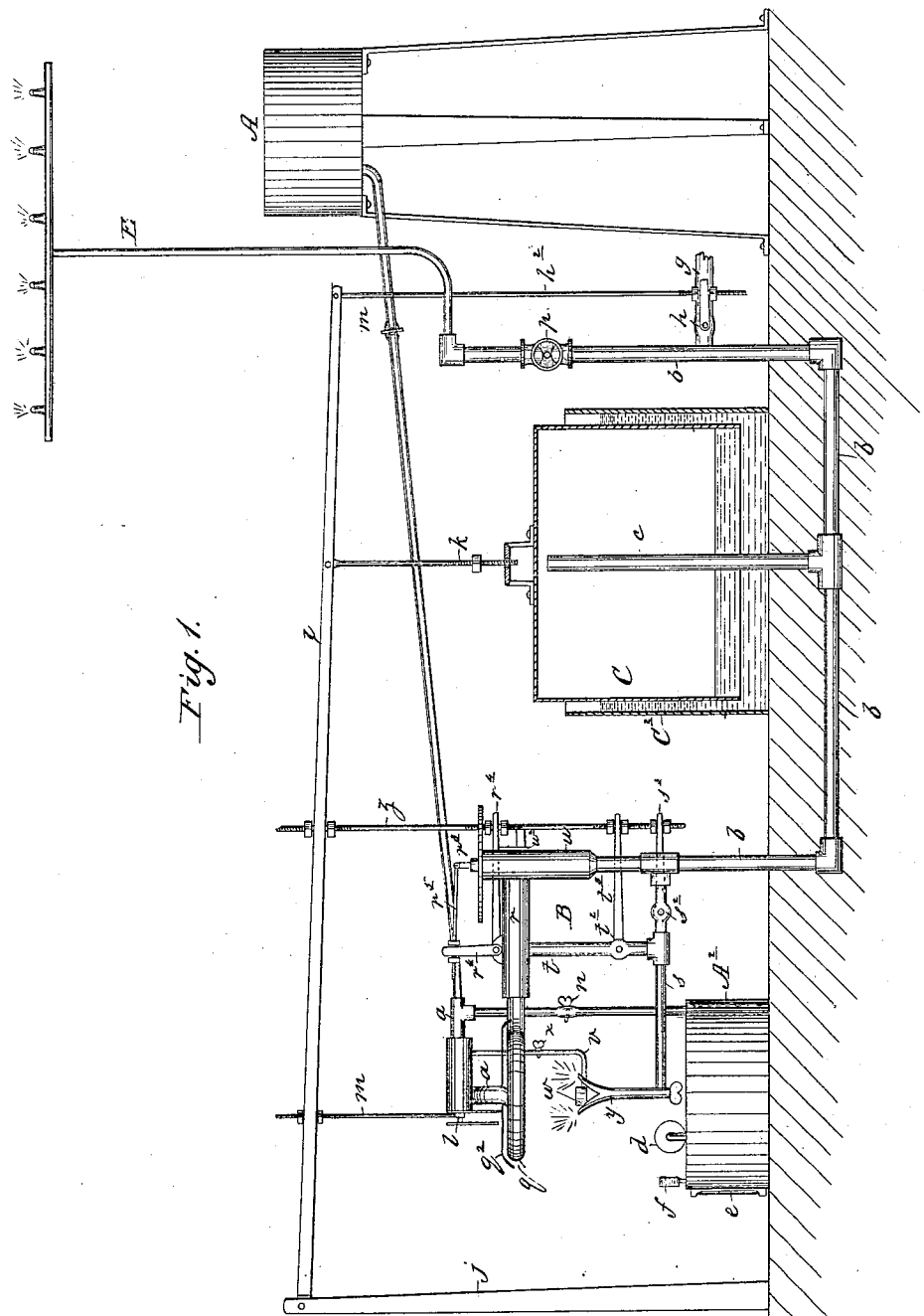
Figure 2:
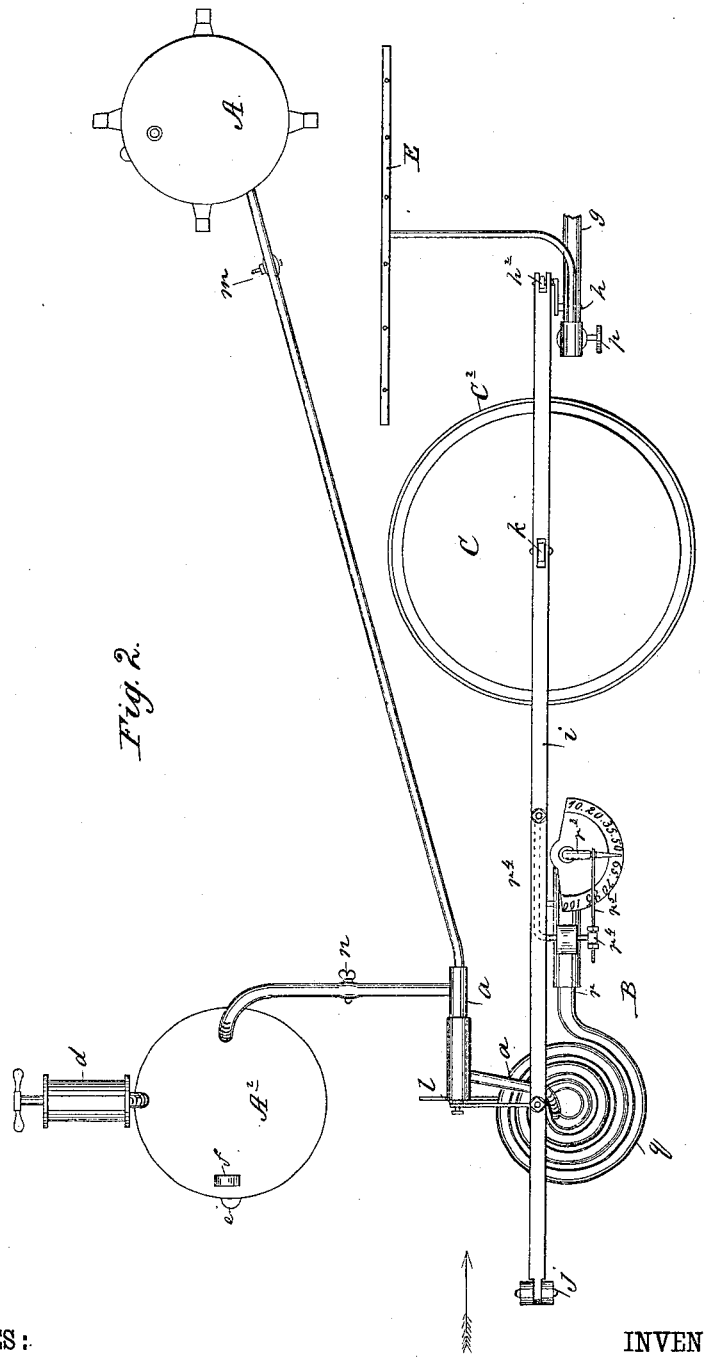

Figure 1 is a side view of my gas apparatus with the gas holder and regulator in section. Fig. 2 is a top or plan view. Fig. 3 is an end view, looking in the direction of the arrow in Fig. 2. Fig. 4 is an enlarged sectional view of the retort and air and gas mixing devices.

My invention relates to a new gas apparatus designed to be used for marine purposes in lighting ships, or on land for hotels, public buildings, and private residences.

The general principle on which the apparatus works is to volatilize the oil to form a vapor, and then mix with this a proportion of air to increase its illuminating power.

The invention consists in the peculiar features of novelty hereinafter described, and pointed out in the claims.

In the drawings, A A$^2$ represent two oil-reservoirs.

B, Fig. 4, is the volatilizing and mixing apparatus; C, the gas-holder, and E a set of the burners.

The oil from one of the reservoirs passes through pipe $a$ to the retort of the vaporizer, and after being vaporized and mixed with air the gas passes through pipe $b$ and through the stand-pipe $c$ into the gas-holder or straight through the pipe $b$ to the burners, the stand-pipe $c$, Fig. 1, being so arranged that the excess of gas passes into the holder, and then passes from the holder again into the pipe $b$. I have shown two reservoirs, A A$^2$, to illustrate the two methods of feeding the oil to the retort. One of these reservoirs, A, is provided with a valve, $m$, and is located at a point above the retort, and the oil feeds to the retort by gravity, while the other, A$^2$, is provided with a valve, $n$, and a check-valve, and is located lower than the retort, and the oil is fed by the pressure of air on its surface produced by a force-pump, $d$, Figs. 2 and 3. For marine uses I prefer to employ the reservoir A, in which case said reservoir is located above decks and feeds by gravity, while for domestic uses on land the reservoir will be located in the cellar or buried in the ground and located below the retort. These reservoirs are constructed air-tight and with an opening through which they are filled, and have also a glass gage, $e$, Fig. 3, to tell the level of the oil, and when a force-pump is used have also a pressure-gage, $f$, to show the pressure upon the oil.

The gas-holder consists of an outer tank, C$^2$, partially filled with water, and a receiver, C, with an open bottom, which rises and falls in tank C$^2$, according to the quantity of the gas in the same. This holder C, it will be seen, serves as a receptacle for the gas in case it is made faster than it is consumed. Now, in an apparatus of this kind it is sometimes the case that a part or the whole of the burners in use will be suddenly turned off either at the burners or at the cock $p$, and as the gas is then not burned as fast as it is made the result is that the gas will rapidly accumulate in the gas-holder and involve the danger of an explosion. To provide for this difficulty and render the apparatus perfectly safe as against this state of affairs, a waste-pipe, $g$, is connected to the pipe $b$, leading to the burners, and a cock, $h$, placed in this waste-pipe $g$, which cock has an arm that is connected to a rod, $h^2$, which at its upper end is fastened to a lever, $i$. This lever $i$ is fulcrumed at its opposite end to a post, $j$, and is also connected to the gas-holder by a rod, $k$, so that when the gas-holder rises to an extreme height from the great accumulation of gas due to turning off the burners the said holder will, through its rod $k$, lift the said lever, and this in turn, by lifting rod $h^2$, turns the arm of the cock $h$ in waste-pipe $g$ and opens a special discharge for the gas, which acts as a relief to bring down the gas-holder. This gas, which is passed through the waste-pipe, may be carried up a chimney or out of doors, or be carried into the furnace of the engine on a ship, or be carried beneath the retort of the volatilizing devices, if found desirable. At the same time, also, that the lever $i$ is raised by this excess of gas a screw-valve, $l$, in pipe $a$, that controls the flow of oil from the oil-reservoir to the retort, is also closed by a rod, $m$, Figs. 3 and 4, that connects with lever $i$.

I will now proceed to describe the volatilizing and air-mixing devices, which are located between the oil-pipe $a$ and the gas-pipe $b$. These consist of the retort $q$ and the rectangularly-arranged branched pipes $r$ $s$ $t$ $u$, Figs. 1 and 4. Tapping the oil-pipe $a$ just back of the regulating-cock is a small oil-pipe, $v$, which at its lower end carries a cup, $w$, and in its length has a cock, $x$. The cup of this pipe occupies a position just beneath the retort, and its function is to hold a quantity of oil, which is let down into the cup by opening the valve $x$, and then ignited to start the volatilization of the oil in the retort. After the oil in the retort commences to be vaporized, then this cup, with its pipe and valve, is thrown out of use, and the heat is supplied to the retort from one or more gas-burners, $y$, arranged beneath the retort in the pipe $s$. For a retort I may employ any suitable form that will properly volatilize the oil; but I prefer a simple coil, $q$, one end of which communicates with oil-pipe $a$, and the other end of which communicates with the pipe $r$. In coiling the pipes for this retort I first pack a number of small wires or rods in the same and then bend the coil. (See Fig. 4.) This prevents the kinking or denting of the pipe in bending, and, being allowed to remain in the pipes, forms a filling for the retort that gives a greater heating-surface and prevents the oil from flowing through too fast, thereby giving a better result in volatilizing the oil.

Just above the retort a detachable pan or lid, $q^2$, may be placed to confine the heat of the burner about said retort.

In the four branched pipes $r$ $s$ $t$ $u$ are four valves, $r^2$ $s^2$ $t^2$ $u^2$, Fig. 4, all of which are controlled in their positions by the rod $z$, Fig. 1, connected to lever $i$, which is operated by the gas-holder.

In the section $t$ of the branched pipes is located the cock $t^2$, which has an arm, $t^3$, Figs. 1 and 4, connected to and operated by the rod $z$, to which it is connected by jam-nuts. This cock is so adjusted as to be held open by lever $i$ when the gas-holder is in the normal working position, or about half-way up, and the function of this cock $t^2$ is to supply gas to the gas-burner that heats the retort.

In the lower section, $s$, of the branched pipes is a cock, $s^2$, which also has an arm, $s^3$, that is connected to the rod $z$ by jam-nuts. This cock is so adjusted that in the normal position of the gas-holder it is closed; but when the gas-holder descends a little below its usual position this cock is opened, and the remnants of gas in the gas-holder may then be allowed to escape through the cock to burn for the purpose of giving light at the burner under the retort during the hours when the burners through the house are shut off and the manufacture of gas is discontinued. This permits a permanent supply of gas to be available, and permits the retort to be kept hot, so that when the manufacture of gas is to be commenced again it is only necessary to turn on the oil-supply. This cock $s^2$ is open when $t^2$ is closed, and vice versa.

For mixing air with the gas to make it more brilliant and prevent it from being so thick and smoky, valves $r^2$ $u^2$ are employed, of which $r^2$ regulates the flow of crude gas and $u^2$ the admission of air. $r^2$ is in the nature of a vertical screw-valve, whose stem is provided with an arm, $r^3$, Fig. 2, and this arm is connected to an elbow-lever, $r^4$, Figs. 1 and 2, by a link, $r^5$, while the other arm of the elbow-lever is connected by jam-nuts to the vertical rod $z$, attached to lever $i$. The valve $r^2$ opens and closes on a seat, $r^6$, Fig. 4, to regulate the amount of gas that passes to pipe $b$, while $u^2$, which is directly connected to rod $z$, so as to partake of its movement, opens and closes over the orifice of an air-inlet pipe, $u^3$, that opens after the manner of an injector-nozzle in the pipe $u$ below valve $r^2$. Both the gas-valve $r^2$ and the air-valve $u^2$, it will be seen, act together from a common moving device, (the rod $z$, lever $i$, and gas-holder,) so that when too much gas is being made the movement of the holder causes at the same time a proportionate diminution of the quantity of gas and air admitted to the holder, and also correspondingly reduces the inflow of oil. This variation in the movement of the gas-holder, it will be seen, is made to automatically adjust the manufacture of gas to the consumption. Thus, if a number of lights are burning and half are turned out, the movement of the gas-holder from the accumulation of the excess of gas instantly causes less oil to be admitted to the retort and less gas and air admitted to the holder.

In order to show what the apparatus is doing, I form the arm of the oil-cock $l$, and also the arm of the gas-valve $r^2$, into an index-hand, and place beneath each of them a graduated plate, Figs. 2 and 3, to show, in gallons, cubic feet, or other measurement, what quantities of oil are being used and how much gas is made. By adjusting these index-hands to certain parts of the graduated plates the valves attached to said index-hands are opened or closed to make the passage of oil or gas just what the graduated plate indicates, and greater or less, as circumstances may require.

It will be seen from the foregoing that the gas-holder and its attachments act as a regulator for the lights. For if, say, fifty lights are burning and forty-five are turned out the balance will continue to burn without unusual pressure by the regulator lessening the pressure of gas in a manner which is self-acting.

Instead of a water-sealed gas-holder, a rising and falling bellows-like arrangement may be used.

Having thus described my invention, what I claim as new is—

1. The combination, with the burner, the retort, the gas-holder, and the pipe $b$, of the pipes $t$ and $s$, having alternately-opening valves $t^2$ and $s^2$, and means for connecting these to the gas-holder, as described, whereby valve $t^2$ is made to supply the burner when the apparatus is making gas and the holder is up, and the valve $s^2$ is made to supply the burner from the gas-holder when the retort is out of action and the holder is down, as set forth.

2. The combination, with the retort and the gas-holder, of the pipes $r\ s\ t\ u$, having valves or cocks $r^2\ s^2\ t^2\ u^2$, and a burner for the retort, the pipe $b$, and means for connecting these cocks or valves with the gas-holder, as described.

3. The combination of the lever $i$, the connecting-pipe, the retort, burner, and the gas-holder with the valves $r^2\ s^2\ t^2\ u^2$, the inlet oil-cock, and the discharge-cock for the gas-holder, all connected to and arranged to be operated automatically by the gas-holder through said lever, as and for the purpose described.

4. The combination, with the volatilizing and mixing devices, the gas-holder, and the connecting-pipes, of the waste-gas cock $h$, the inlet oil-cock $l$, the lever $i$, and the rods $m$, $k$, and $h^2$, substantially as shown and described.

THOMAS J. BROUGH.

Witnesses:
 SOLON C. KEMON,
 CHAS. A. PETTIT.